US007239887B1

(12) United States Patent
Sandhu et al.

(10) Patent No.: US 7,239,887 B1
(45) Date of Patent: Jul. 3, 2007

(54) MOBILE CONTROL APPARATUS

(75) Inventors: Kulbir S. Sandhu, San Jose, CA (US);
Rodric C. Fan, Fremont, CA (US);
David Mleczko, San Jose, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 581 days.

(21) Appl. No.: 09/697,518

(22) Filed: Oct. 25, 2000

(51) Int. Cl.
*H04M 1/00* (2006.01)
(52) U.S. Cl. .............................. 455/550.1; 455/414.1; 455/412.2; 340/539.11; 340/539.17; 342/357.09
(58) Field of Classification Search ................ 455/456, 455/414, 420, 456.5, 550.1, 414.1, 412.2; 340/870.01, 539.11, 539.17; 342/357.11, 342/357.09; 709/216, 219, 217
See application file for complete search history.

(56) References Cited

U.S. PATENT DOCUMENTS

| | | | |
|---|---|---|---|
| 5,719,771 A * | 2/1998 | Buck et al. ................. | 364/443 |
| 5,959,577 A * | 9/1999 | Fan et al. ............... | 342/357.13 |
| 6,473,790 B1 * | 10/2002 | Tagi ........................... | 709/216 |
| 6,609,004 B1 * | 8/2003 | Morse et al. ............ | 455/456.5 |

\* cited by examiner

*Primary Examiner*—Danh Le
(74) *Attorney, Agent, or Firm*—Edward C. Kwok; MacPherson Kwok Chen & Heid LLP

(57) ABSTRACT

Vehicle maintenance-related services are provided from a server over a wide area network, such as the Internet. Under one method, a server that is accessible over the wide area network through a wireless communication link is provided. Then, in a vehicle, an apparatus is provided to collect, over a data bus in the vehicle, data relating to an operation of the vehicle. The data received from the data bus is then communicated to the server over the wireless communication link. Based on the data received at the server, the maintenance-related services is then initiated. The operation data of the vehicle can be collected from various subsystems of the vehicle, such as a brake sub-system, an engine sub-system and various sensors located at various subsystems of the vehicle. Under one mode of operation, the data collected from these subsystems are reported to the server at predetermined time intervals. In one embodiment, the apparatus of the invention includes a positioning apparatus for determining a location of said vehicle from received ranging signals. Such signals can be received from a global position system (GPS) or a ranging system based on triangulation, such as those used in cellular telephone systems.

9 Claims, 3 Drawing Sheets

Applications and Benefits:
• reduce unexpected breakdowns & service
• enhance safety - eliminate highway breakdowns
• after sale quality control
• consumer quality reports

MOBILE CONTROL APPARATUS

BACKGROUND OF THE INVENTION

1. Field of the Invention

The present invention relates to positioning technology. In particular, the present invention relates to applications of positioning technology to delivering relevant services to a vehicle.

2. Discussion of the Related Art

In recent years, commercial applications based on positioning systems have been developed. These applications are based, for example, on the Global Position System (GPS), or a cellular telephone network (using triangulation method). For example, one position-based system delivering services over the internet is disclosed in U.S. patent application Ser. No. 09/521,247 ("Copending Application"), entitled "Method and Structure for Distribution of Travel Information Using a Network," to Fan et al., filed Mar. 8, 2000, which is a continuation-in-part application of U.S. Pat. No. 5,959,577, filed Aug. 28, 1997. The Copending Application and its parent application are assigned to @Road, Inc., the assignee also of the present invention. The disclosure of the Copending Application is hereby incorporated by reference in its entirety.

SUMMARY OF THE INVENTION

The present invention provides vehicle maintenance-related services from a server over a wide area network, such as the Internet. A method of the present invention includes (a) providing a server accessible over the wide area network through a wireless communication link; (b) collecting, over a data bus in the vehicle, data relating to an operation of the vehicle; (c) communicating the data received from the data bus to the server over the wireless communication link; and (d) based on the data received at the server, initiating the maintenance-related services.

In one embodiment, the operation data of the vehicle are collected from various subsystems of the vehicle, such as a brake sub-system, an engine sub-system and various sensors located at various subsystems of the vehicle. Under one mode of operation, the data collected from these subsystems are reported to the server at pre-determined time intervals. In one embodiment, the apparatus of the invention includes a positioning apparatus for determining a location of said vehicle from received ranging signals. Such signals can be received from a global position system (GPS) or a ranging system based on triangulation, such as those used in cellular telephone systems.

According to one aspect of the present invention, applicable maintenance-related services include scheduling the vehicle for a maintenance procedure at a service center, based on a current operating condition of the vehicle received from the apparatus of the present invention, or based on a periodic schedule. Because the position of the vehicle is provided along with the operating condition of the vehicle, the server can render a maintenance-related service that includes ordering parts for delivery to the service center for use in conjunction with the maintenance procedure. Alternatively, based on the operational history of the vehicle and the location of the vehicle, the server can render "road side" assistance to an operator of the vehicle, or enforce a mandatory work rule (e.g., 8 hours' rest after a 12-hour work day or 1200 miles).

In addition, the server can also download diagnostic commands to the data bus to diagnose the various subsystem in operation in the vehicle, based on industry standard protocols.

In one embodiment, the wireless link couples an apparatus of the present invention to a wireless gateway, from which the server can be accessed over the wide area network. The wireless link can be provided, for example, by a cellular telephone network.

According to another aspect of the present invention, a mobile control apparatus is provided. In one embodiment, the mobile control apparatus includes (1) a position circuit receives ranging signals over a first wireless link from a positioning system to provide a position of the mobile position apparatus, (2) a communication interface that is capable of maintaining a wireless link for communicating with a server on a wide area network; (3) a peripheral interface to a peripheral device for transferring control information between the peripheral device and the mobile control apparatus; (4) a controller for executing a program that (a) control operations of the position circuit, the communication interface, and the peripheral interface; and (b) transfers the position and the control information to said server; and (5) a memory for storing the program. In one embodiment, the position circuit can be implemented by GPS RF front-end and data processing application-specific integrated circuits.

The present invention is better understood upon consideration of the detailed description below and the accompanying drawings.

BRIEF DESCRIPTION OF THE DRAWINGS

In the detailed description below, to provide clarity, and to facilitate correspondence among the figures, like elements in the figures are provided like reference numerals.

DETAILED DESCRIPTION OF THE PREFERRED EMBODIMENTS

Figure 1:
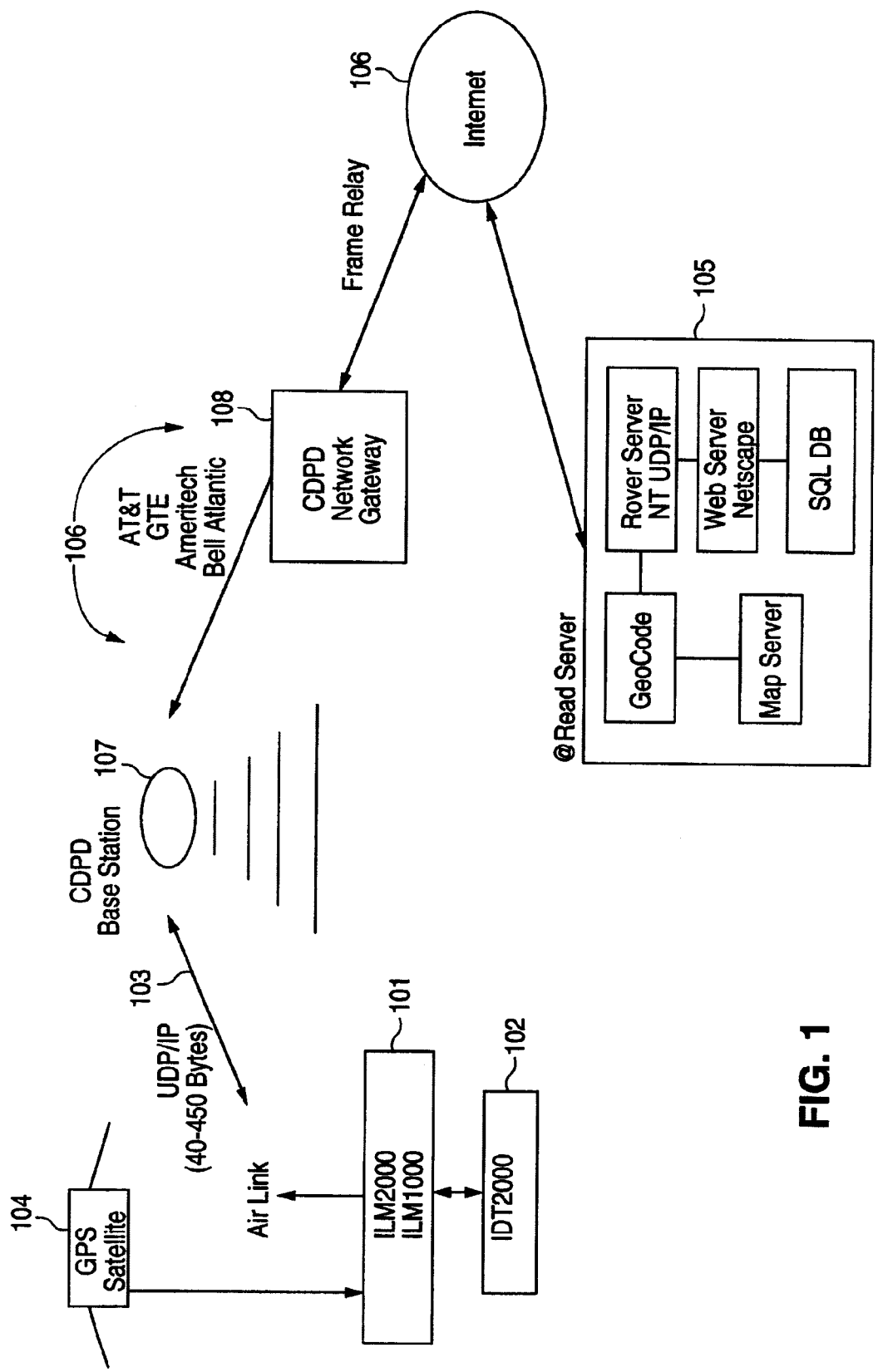
FIG. 1 shows positioning system 100 in which the present invention is applicable.
Figure 2:
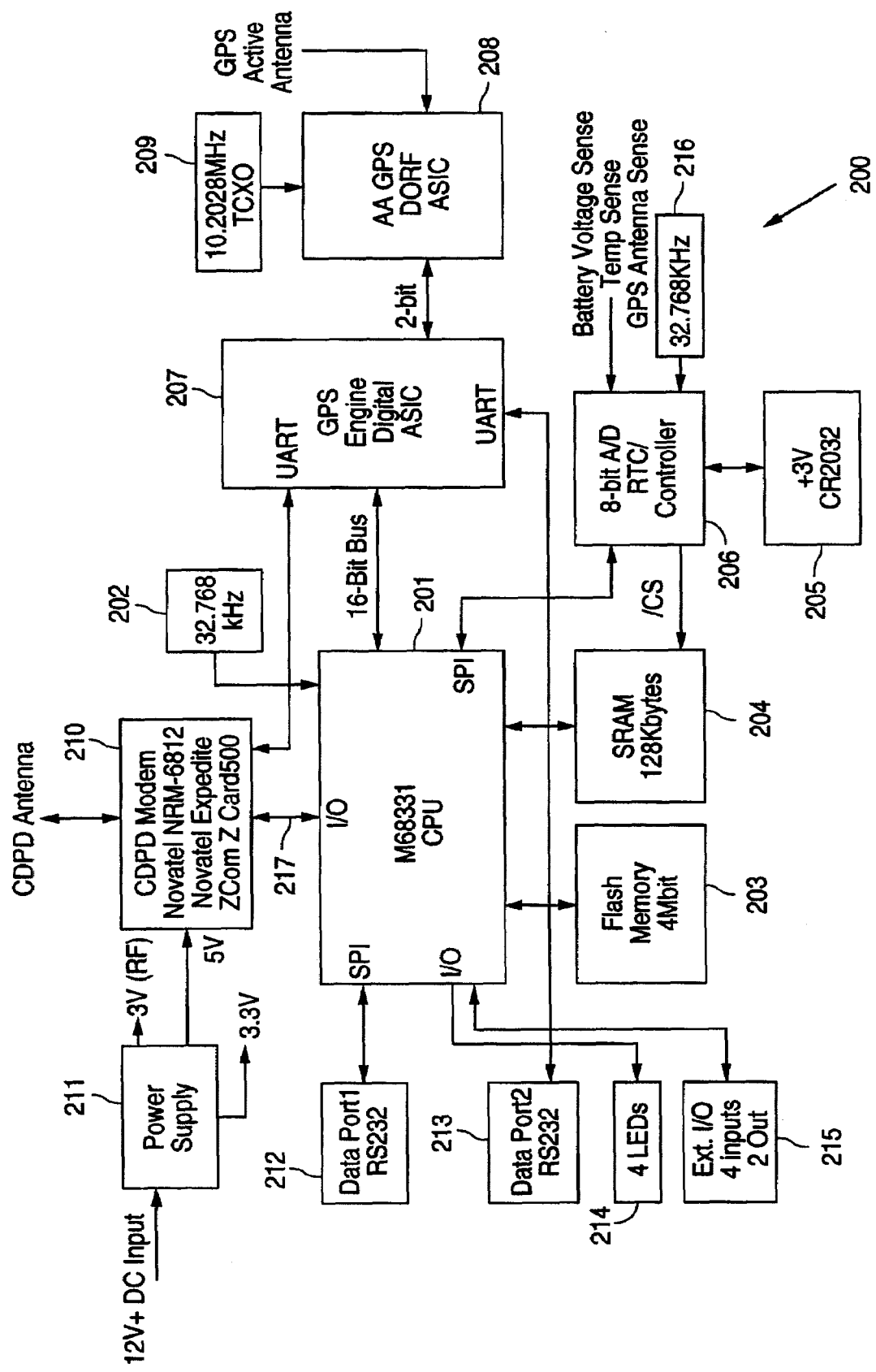
FIG. 2 shows one implementation of ILM 101 by circuit 200.

The present invention provides a system and a method for delivering services to a vehicle or a traveler based on the vehicle or the traveler's location determined in a positioning system. FIG. 1 shows positioning system 100 in which the present invention is applicable. As shown in FIG. 1, positioning system 100 includes an internet location manager (ILM) 101, which is a mobile control device having the capabilities of both obtaining its own position from a positioning system (e.g., GPS) and communicating over a computer network (e.g., the internet) to a server providing services of the present invention. ILM 101 can be provided, for example, in a vehicle. One possible implementation of ILM 101 is shown in FIG. 2, which is discussed in further detail below. As shown in FIG. 1, ILM 101 interacts with a user through, for example, console device 102. Typically, console device 102 includes a key board or a pointing device for data entry, and a display for output of information.

ILM 101 receives from the positioning system (e.g., GPS satellite 104) position input information, which is processed to provide ILM 101's current position. In addition, ILM 101 communicates over wireless link 103 (e.g., a CDPD, GSM, iDEN, CDMA or another wireless or cellular telephone communication link) with server 105, which delivers location-relevant services to ILM 101 over wide area network 106 (e.g., the internet). As shown in FIG. 1, wireless link 103 connects ILM 101 with wireless communication system 106 that includes cellular telephone network 107 and gateway 108. Gateway 108 is typically a switch or a computer that couples and provides protocol conversion for data traffic between cellular telephone network 107 and wide area network 106. Server 105 can have, for example, a hypertext "web" interface and provides access to a database having location-relevant information.

FIG. 2 shows one implementation of ILM 101 by circuit 200. As shown in FIG. 2, circuit 200 includes central processing unit (CPU) 201, which is typically a general-purpose microprocessor, such as a Motorola 68331 microprocessor. CPU 201 is the main controller of the system. Crystal oscillator 202 provides a time reference for circuit 200. Flash memory module 203 and static random access memory (SRAM) 204 provide non-volatile and volatile storage for CPU 201. In this embodiment, flash memory module 203 provides 512 K-bytes of non-volatile storage, and SRAM 204 provides 128 K-bytes of storage. The non-volatile storage is used primary for storing the firmware of ILM 101, GPS look-up tables for positioning information calculation, and configuration parameters, such as device identification. SRAM 204 provides run-time storage, such as positioning information—position, velocity and time (PVT).

Battery 205 maintains the content of SRAM 204. Real time clock (RTC) and system controller 206 provides a real time clock and non-volatile random access memory (NVRAM) control. In addition RTC controller 206 includes an analog-to-digital (A/D) converter. In this embodiment, the A/D converter is used to receive ignition, temperature and GPS antenna data. RTC and system controller 206, which receives a clock signal from 32.768 KHz oscillator 216, can be implemented, for example, by an integrated circuit DS 1670E, which is available from Dallas Semiconductor.

GPS RF front-end 208 and GPS Engine 207 implement the GPS signal processing functions of ILM 201. In this embodiment, GPS RF front-end 208 can be implemented by four VRF-2 application specific integrated circuits (ASIC) or a VRF-12 ASIC, all of which are integrated dual conversion front end ASICs available from @Road, Inc. GPS RF ASIC 208 receives L1 (1575.42 MHz) GPS signal, and provide a down-converted bandpass 2-bit quantized signal for data processing. GPS Engine 207, which receives down-converted signals from GPS RF front-end 208 and provides signal processing to compute PVT information for ILM 201. In this embodiment, GPS Engine 208 can be implemented by a VGP-12 ASIC available from @Road, Inc. In this embodiment, GPS Engine 207 provides a memory-mapped interface to CPU 201, a GPS clock controller, GPS correlator channels with common control, receiver gain control, and parallel and serial ports. In this embodiment, GPS Engine 207 communicates with CPU 201 over a 16-bit parallel bus. One example of GPS signal data processing is disclosed in U.S. Pat. No. 5,990,827, entitled "Structure of a Position Processing Apparatus," to Fan et al., filed Mar. 28, 1997, which is also assigned to @Road, Inc., the assignee also of this invention.

Modem 210 provides an interface to an external communication system, such as a cellular telephone network. Modem 210 allows ILM 101 to communicate with server 105 over the external communication system and gateway 108. In this embodiment, modem 210 can be implemented, for example, by a Novatel NRM-6812 modem card. Modem 210 communicates with CPU 201 over input-output (I/O) bus 217. Modem 210 receives a serial bit stream from and transmit a serial bit stream to a built-in universal asynchronous receiver and transmitter (UART) in GPS Engine 207.

ILM 101 communicates with external circuits through industry standard interfaces at one or more data port, such as data ports 212 and 213 of circuit 200. In one implementation, circuit 200 communicates over output port 212 (provided as an RS-232 interface) with a multimedia output device during normal operation, and a configuration tool and a debugging tool during manufacturing and testing. Data port 213 is provided to interface with additional external devices and system. A multimedia output device is capable of providing video output, audio output, or both. In one embodiment, described in further detail below, an interface to an automobile industry standard bus allows ILM 101 to obtain operating data of the vehicle relevant to vehicle-related services provided by server 105. Some examples of automobile industry standard buses include SAE 1708 bus, SAE J1939 bus, CAN bus and the IDB bus.

In addition, circuit 200 provides visual status indicators to an operator of the vehicle using LEDs 213. Some examples of status indicators that can be implemented by LEDs 213 include power on/off, active/inactive communication with external communication network, operative/non-operative status of the GPS system in circuit 200, active/inactive link to server 105. In this embodiment, input and output terminals 215 provide additional means for input and output control signals that can be used by the firmware of ILM 101.

The firmware in ILM 101 can be loaded and updated using over-the-air programming (OTAP) through modem 210. OTAP can be provided using industry standard TFTP ("trivial file transfer protocol"). In TFTP, a TFTP file server is provided from which ILM 101 can request one or more files under operator control, or control by server 105. Upon receiving the requested file, ILM 101 is reconfigured by executing a programming file to load the new firmware into non-volatile memory 203. The programming file can be one of the files transferred under TFTP.

Figure 3:
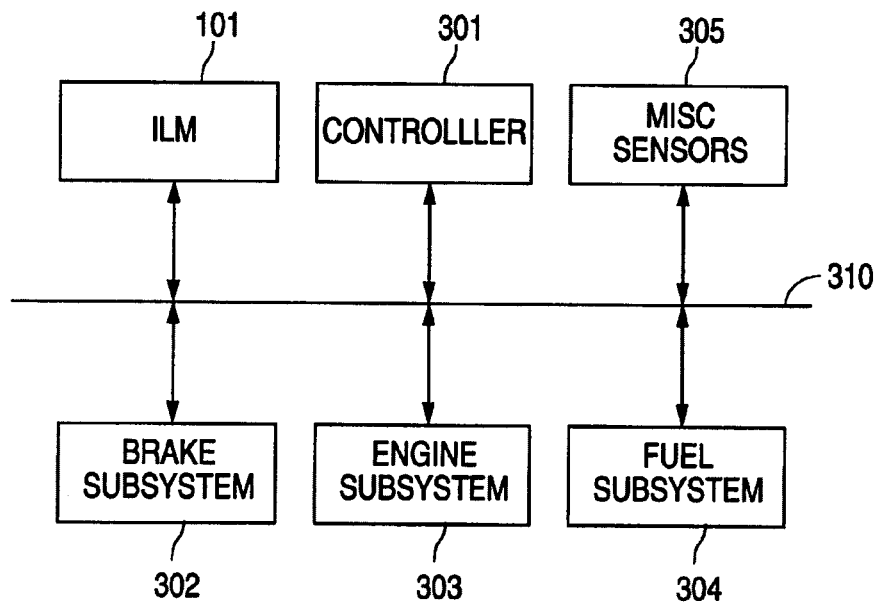
FIG. 3 provides system 300, which is one possible implementation of a system that allows server 105 to provide vehicle-related services, in accordance with the present invention.

As mentioned above, ILM 101 can be coupled to an industry standard automobile bus to allow vehicle-related services. FIG. 3 provides system 300, which is one possible implementation of a system that allows server 105 to provide vehicle-related services. As shown in FIG. 3, system 300 includes ILM 101 coupled into industry standard automobile bus 310, through data port 213. Bus 310 includes bus controller 301, which provides general access control to bus 310. Bus 310 can be accessed by, and can provide access to, various subsystems and sensors of the vehicle. For example, as shown in FIG. 3, brake subsystem 302, engine subsystem 303, fuel subsystem 304 and various sensors 305 (e.g., engine RPM sensor, oil pressure sensor, tire pressure sensor, battery charge status sensor, odometer reading, etc.). Typically, server 105 can obtain status information of each of subsystem 302-304 and sensors 305 through ILM 101. Alternatively, server 105 can provide through ILM 101 diagnostic commands to each of subsystems 302-304 for diagnostic purposes.

Figure 4:
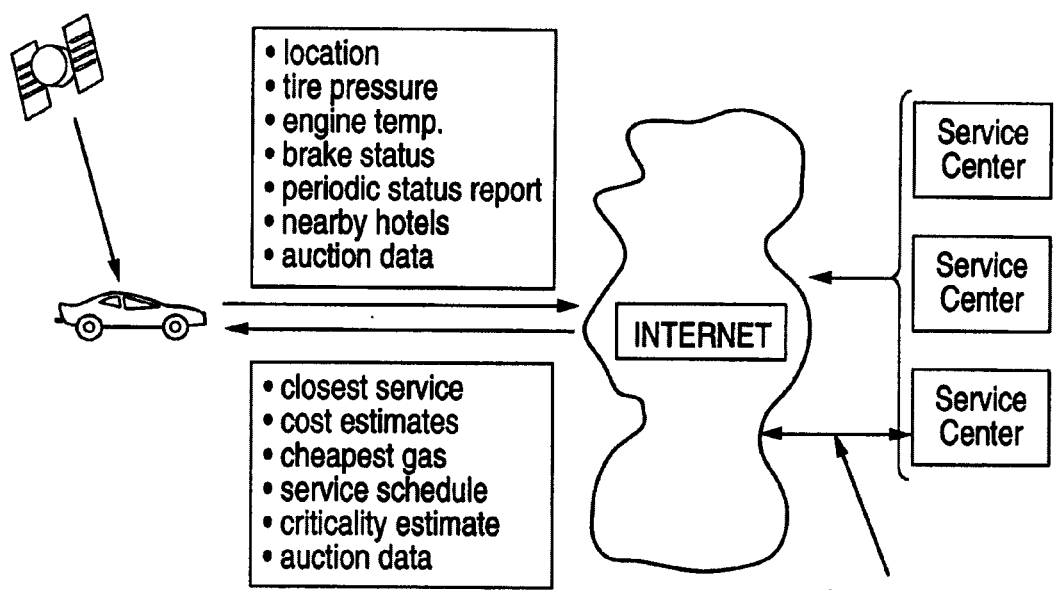
FIG. 4 illustrates, schematically, a method for "just-in-time" maintenance of a vehicle, in accordance with the present invention.

Based on a configuration such as system 300, a number of vehicle-related services can be provided. One service that can be provided by server 105, for example, is a "just-in-time" maintenance service, which is schematically represented by FIG. 4. As shown in FIG. 4, ILM 101 can be programmed to report to server 105 on a periodic basis the status information of, each of subsystem 302-304 and sensors 305. From this report, server 105 can determine the current operative condition of the vehicle and can compile vehicle operation history. At scheduled intervals, or as deemed necessary from the operative condition of the vehicle, server 105 can advise the operator of the vehicle to bring the vehicle to a service center for scheduled or unscheduled maintenance. Such maintenance service may include replacement of brake pads, fluids, tires, readjustment of engine valves etc. In one embodiment, based on the current location of the vehicle and a database of the service centers available in the vicinity, server 105 can also advise the operator of a designated service center available, based on distance, business relationship with the operator, price and other considerations. In one embodiment, where the vehicle is a member of a fleet of a large transportation concern, server 105 is integrated with the enterprise resource planning system of the transportation concern. In that embodiment, server 105 can also schedule the required maintenance procedure with the service center in advance of the vehicle's arrival, and order any necessary parts for delivery to the service center prior to the scheduled maintenance procedure.

Because server 105 can monitor the vehicle continuously, the operator of the vehicle or a dispatcher can be notified immediately of any unusual operating condition that may lead to an impending failure or emergency. Such timely information can prevents catastrophic failure and enhances safety. In another application, fuel prices are surveyed ahead of the vehicle arriving at a service area to select the most cost efficient supplier. Operation data across a large number of vehicles in a fleet can be compiled for statistical analysis valuable for more accurate cost and equipment lifetime analyses.

With the "just-in-time maintenance" service, highest operative performance and safety in the trucking concern's vehicles is achieved, and the "down time" for performing maintenance procedures are minimized.

Another service server 105 can provide based on a system such as system 300, also illustrated schematically by FIG. 4, is "on-the-road" assistance to the vehicle's operator and enforcement work rules. For example, based on the operation history of the vehicle for a particular work day, or the number of miles driven or the tasks completed for the day, server 105 advises the vehicle's operator that a mandatory rest stop, motivated by safety concerns for example, is required. In addition, based on the current location of the vehicle, server 105 can guide the operator to a nearby rest facility (e.g., a motel), make reservations for a room at the rest facility and arrange for payment of services by the trucking company. Arrangements for other operator conveniences, such as a meal stop, can be similarly made.

The detailed description above is provided to illustrate specific embodiments of the present invention and is not intended to be limiting. Numerous variations and modifications within the scope of the present invention are possible. The present invention is set forth in the accompanying claims.

We claim:

1. A mobile control apparatus, comprising:
    a position circuit for receiving ranging signals over a first wireless link from a positioning system and for providing a position of said mobile position apparatus;
    a communication interface for maintaining a wireless link for communicating with a server on a wide area network, said server being integrated with an enterprise resource planning system;
    a peripheral interface to a peripheral device, said interface provided to transfer control information between said peripheral device and said mobile control apparatus;
    a controller for executing a program that (1) control operations of said position circuit, said communication interface, and said peripheral interface; and (2) transfers said position and said control information to said server as input to said enterprise resource planning system; and
    a memory for storing said program.

2. A mobile control apparatus as in claim 1, wherein said communication interface comprises a modem capable of operating in a cellular telephone system.

3. A mobile control apparatus as in claim 1, wherein said position circuit comprises a down-converter for a global position system (GPS).

4. A mobile control apparatus as in claim 1, wherein said position circuit determines said position based on triangulation of ranging signals.

5. A mobile control apparatus as in claim 1, wherein said peripheral interface comprises an industry standard bus interface.

6. A mobile control apparatus as in claim 1, wherein said memory comprises a non-volatile portion and a volatile portion.

7. A mobile control apparatus as in claim 1, wherein said position circuit comprises a radio frequency front-end circuit and a signal processing circuit.

8. A mobile control apparatus as in claim 7, wherein said radio frequency front-end circuit and said signal processing circuit are provided as application-specific integrated circuits.

9. A mobile control apparatus as in claim 8, wherein said controller comprises a general-purpose microprocessor.

* * * * *